United States Patent [19]
Gabor

[11] 3,870,870
[45] Mar. 11, 1975

[54] DECODER FOR HIGH DENSITY DECODING SYSTEM

[75] Inventor: Andrew Gabor, Huntington, N.Y.

[73] Assignee: Potter Instrument Company, Inc., Plainview, N.Y.

[22] Filed: July 25, 1973

[21] Appl. No.: 382,550

Related U.S. Application Data

[60] Continuation of Ser. No. 167,437, July 29, 1971, abandoned, which is a continuation of Ser. No. 735,931, Feb. 26, 1968, abandoned, which is a division of Ser. No. 458,110, May 24, 1965, Pat. No. 3,374,475.

[52] U.S. Cl. ....... 235/92 MB, 235/92 R, 235/92 PE, 340/174.1 H
[51] Int. Cl. ........................................... H03k 21/10
[58] Field of Search.......... 235/92 MB; 340/174.1 H

[56] References Cited

UNITED STATES PATENTS 3,404,391 10/1968 Chur ............................... 340/174.1

*Primary Examiner*—Gareth D. Shaw
*Assistant Examiner*—Robert F. Gnuse
*Attorney, Agent, or Firm*—Lane, Aitken, Dunner & Ziems

[57] ABSTRACT

This specification discloses a high density recording and reproducing system in which binary information is divided into pairs of bits and different flux transition patterns are recorded to represent each pair of digits. Each pattern is made of three flux transition positions and the patterns are selected so that at least one transition is present in every adjacent pair of transition positions. The pattern selected to represent one particular pair of digits is made dependent upon an adjustment pattern recorded to represent another pair of digits. The decoder of the system separates the pulses in accordance with whether or not they are preceded by long or short intervals. These pulses are then applied to a different set of gates. A counter enables a different gate in each set in response to each different condition of the counter. The counter is switched between conditions in response to the separated pulses. Clock and information signals are derived from pulses passing through the gates.

6 Claims, 5 Drawing Figures

Figure 1:
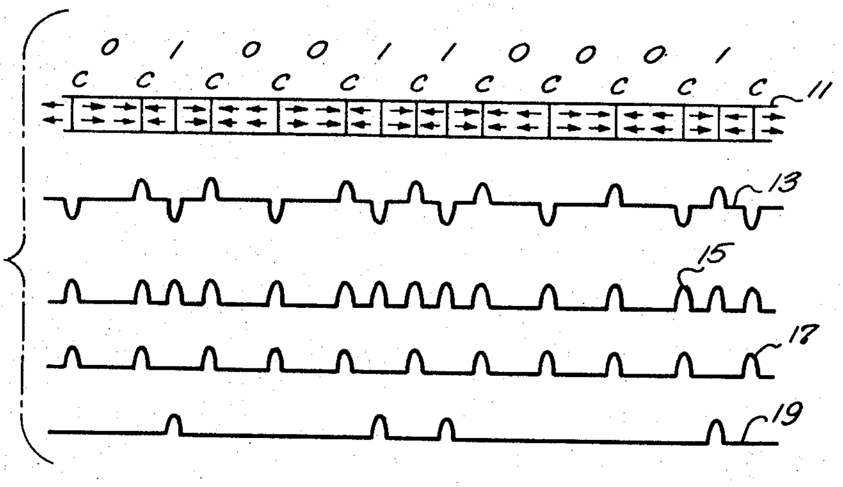

INVENTOR
Andrew Gabor

BY Lane, Aitken, Dunner & Ziems
ATTORNEYS

INVENTOR
Andrew Gabor
BY Lane, Aitken, Dunner & Ziems
ATTORNEYS

INVENTOR
Andrew Gabor

BY Lane, Aitken, Dunner & Ziems
ATTORNEYS

DECODER FOR HIGH DENSITY DECODING SYSTEM

CROSS REFERENCE TO RELATED APPLICATIONS

This application is a continuation of application Ser. No. 167,437, filed July 29, 1971, which became abandoned on the filing date of this application. Ser. No. 167,437 is a continuation of application Ser. No. 735,931, filed Feb. 26, 1968, now abandoned. Ser. No. 735,931 is a divisional application of application Ser. No. 458,110, filed May 24, 1965, now U.S. Pat. No. 3,374,475. This application thus has an effective filing date of May 24, 1965. This invention, generally relates to data processing systems and, more particularly, to a system for storing information magnetically in tracks on such media as tape, drums, discs and the like, in which self-clocking information is stored with increased density.

In the field of data processing, there is a continuous effort made to increase the capacity of the various types of memories used to process data. In those data processing memories that involve magnetic storage on tapes, drums and discs, this effort has been directed toward increasing the density with which the information is stored.

One high density magnetic storage system for storing information on magnetic tapes, drums and discs is the subject matter of a copending application, Ser. No. 26,538 of Andrew Gabor filed May 3, 1960, now U.S. Pat. No. 3,217,329, and assigned to the same assignee as this invention.

In the system of this application, information is stored with a non-return-to-zero (NRZ) format, and the information is self-clocking. In the NRZ format, the information is recorded in magnetic tracks, and each track is magnetized continuously in either one direction or another. Pulses are recorded in the tracks by reversing the direction of magnetization of the tracks. A reversal of magnetization is referred to as "flux transition."

In the system of the Gabor application Ser. No. 26,538, now U.S. Pat. No. 3,217,329 referred to above, clock pulses are recorded along with the information pulses in each track, and one clock pulse is recorded for each digit or "bit" of information.

The system of the present invention improves on the system disclosed in the Gabor application Ser. No. 26,538, now U.S. Pat. No. 3,217,329, by increasing the density with which the information is stored by one third. This increase in information density is accomplished by recording two bits of information for each clock pulse recorded in the track.

Because of the effects of pulse crowding, the increase in the ratio of information bits to clock pulses cannot be carried out using the same code disclosed in the above-mentioned Gabor application, without reducing the density of the flux transition positions in the track. If the density of the flux transition positions is reduced sufficiently to avoid the effects of pulse crowding, the resulting density of information will be reduced to a point where it is no better than that obtained with the ratio of one clock pulse to one information bit.

The system of the present invention uses a code which permits the same density of flux transition positions as can be used with a system in which there is one clock pulse for each information bit without any increased pulse crowding effects.

Accordingly, an object of the present invention is to provide an improved magnetic storage system.

Another object of the present invention is to provide an improved system for the storage of information in magnetic tracks.

A further object of the present invention is to provide an information storage system in which self-clocking information can be stored with increased density.

Still another object of the present invention is to increase the density with which information can be stored.

Figure 2:
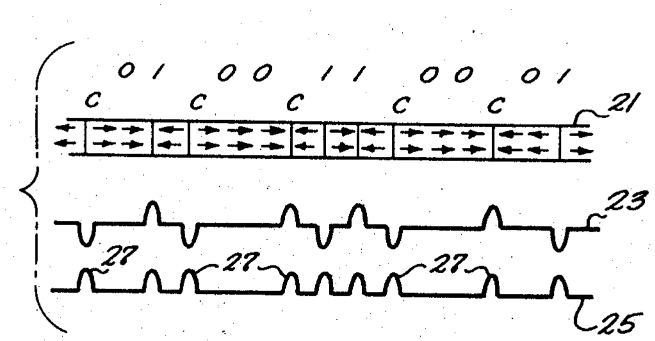
Figure 3:
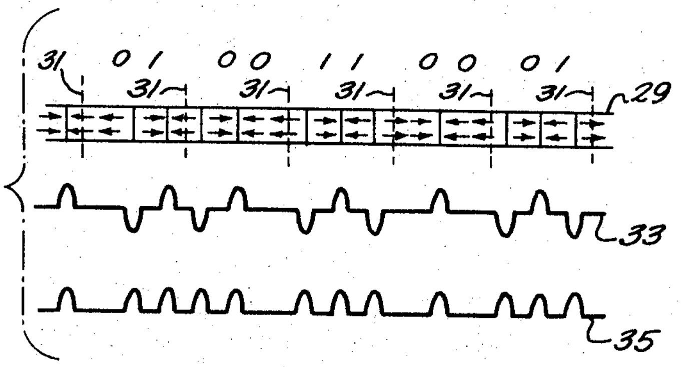
Figure 4:
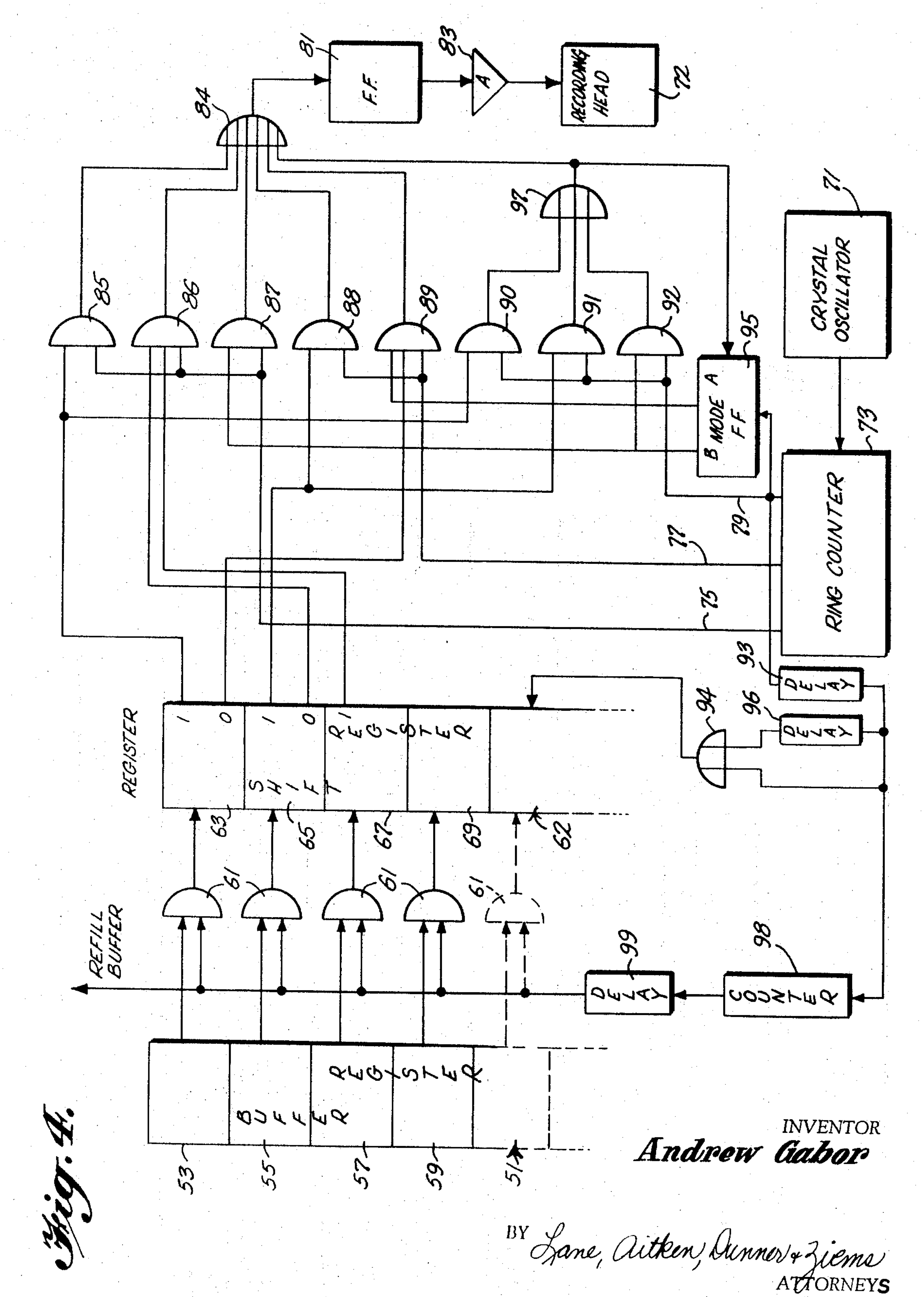
Figure 5:
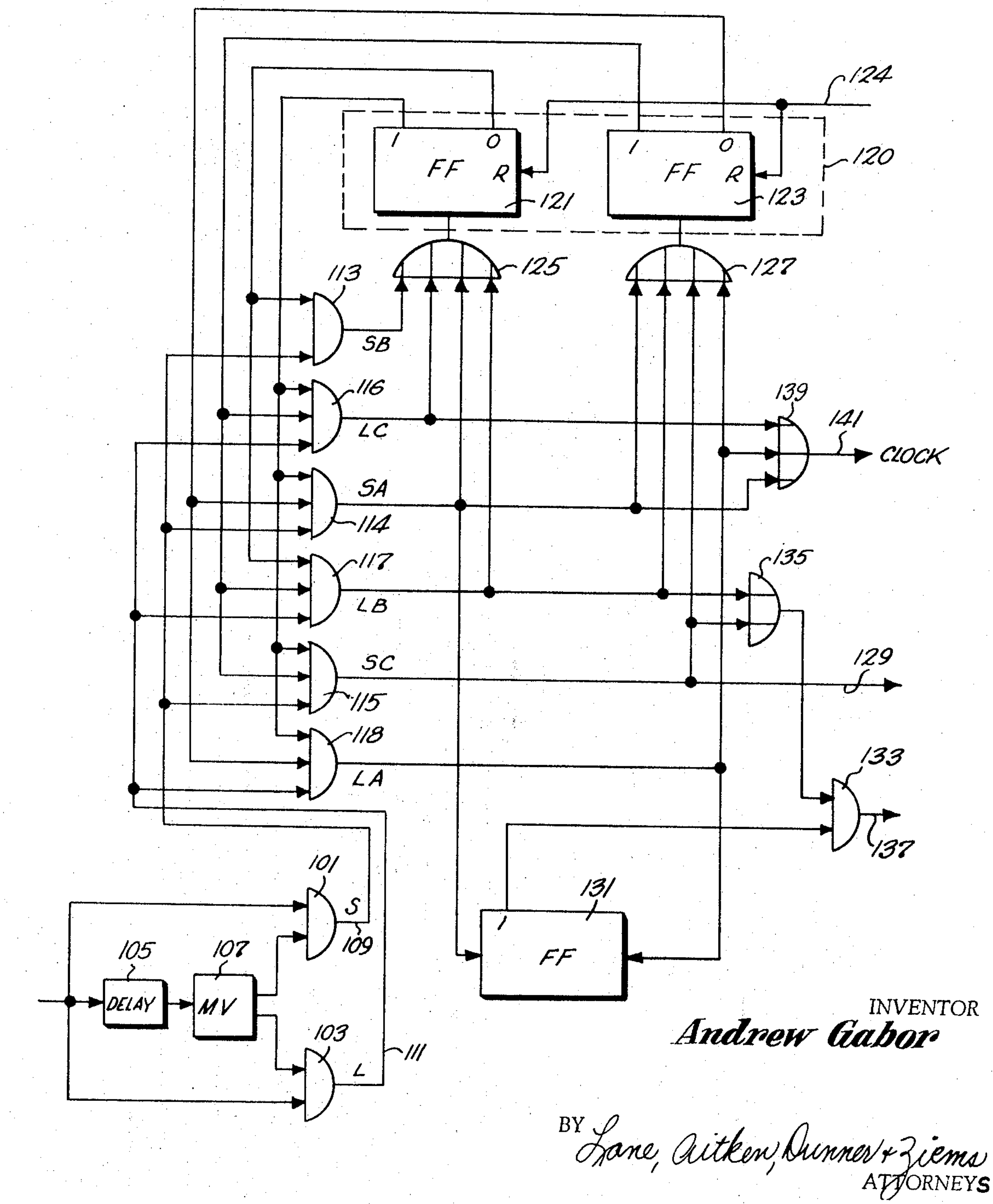

Further objects and advantages of the present invention will become readily apparent as the following detailed description of the invention unfolds and when taken in conjunction with the drawings, wherein:

FIG. 1 illustrates how information is recorded in the self-clocking NRZ system in the above-mentioned Gabor application Ser. No. 25,538, now U.S. Pat. No. 3,217,329;

FIG. 2 illustrates how the system of FIG. 1 theoretically could be altered to increase the information density stored in a magnetic track by increasing the ratio of the information bits to the clock pulses;

FIG. 3 schematically illustrates a track with NRZ data recorded therein and waveforms associated with the track in accordance with the system of the present invention;

FIG. 4 is a block diagram of a system for recording information in accordance with the system of the present invention; and FIG. 5 is a block diagram illustrating a circuit for reading out information stored in a magnetic track in accordance with the present invention.

PRIOR ART

In the high density magnetic storage system disclosed in the above-mentioned Gabor application Ser. No. 26,538, now U.S. Pat. No. 3,217,329, the binary information is recorded in a manner such as that illustrated in FIG. 1, in which the reference number 11 designates one track on a magnetic tape, or the like, containing the recorded binary information. The line of digits just about the track 11 represents the binary information recorded in the track, and the arrows in the track 11 indicate the manner in which the track is magnetized to store this binary information.

As illustrated, the track is magnetized continuously in one direction or in the opposite direction, and the direction of magnetization of the track is reversed repeatedly. Each reversal of magnetization is referred to as a "flux transition" and represents the recording of a pulse. "Clock" pulses are recorded by providing flux transitions on the track at regular intervals.

The flux transitions which represent clock pulses in the track 11 are indicated by the letter C directly above the transitions in the track 11. The transitions which represent these recorded clock pulses divide the track into "cells," and a binary information bit (either a "1" or "0") is recorded in each of these cells.

A binary 1 is recorded by providing a flux transition in the middle of the cell; that is, midway between adjacent flux transitions representing two clock pulses. A binary 0 is recorded by the absence of any flux transition in the cell; that is, no flux transition between two adjacent transitions which represent clock pulses.

When an NRZ recording is "read out," each flux transition will produce an output pulse as it passes a reading station. The pulses produced in this manner will alternate in polarity because successive pulses will be produced by flux changes in opposite directions.

When the track 11 is read out by passing a reading station at a constant rate, the resulting pulse train that is produced will correspond to the waveform 13 in FIG. 1. This pulse train then will be passed through a full wave rectifier to produce a train of pulses having the same polarity, such as illustrated by the waveform 15.

In this waveform 15 binary "zeros" are represented by an absence of a pulse between two adjacent clock pulses. The clock pulses are distinguished from the information pulses by determining whether the interval between each clock pulse and the next succeeding pulse is a long or a short interval. If the interval it is a long interval, then the next succeeding pulse is another clock pulse. If the interval is short, then the next succeeding pulse is an information pulse.

When a pulse train corresponding to the waveform 15 is separated into clock pulses and information pulses, a train of clock pulses, corresponding to the waveform 17, and a train of information pulses, corresponding to the waveform 19, are produced. It will be apparent that the separated clock and information pulse trains will readily yield the binary information represented thereby. If an information pulse occurs between two successive clock pulses, then a binary 1 is represented, and if no information pulse occurs between two successive clock pulses, then a binary 0 is represented.

It might seem that the information density could be increased by storing two information bits for every clock pulse in the magnetic track. That is, the flux transitions representing clock pulses would be provided on the track at regularly occuring intervals, but the regular intervals would be 50% longer than in the track 11. Between each pair of adjacent clock transitions, two binary information bits would be stored.

The track 21 illustrates how the same binary information that is stored in the track 11 is stored with 0's being represented by the absence of a flux transition and 1's being stored by the presence of a flux transition with two possible flux transitions occurring after each clock pulse. The flux transistions representing clock pulses in the track 21 are designated by the letter C above each such flux transition.

The binary information stored in the track is indicated by the line of 0's and 1's above the track 21. It will be noted that the same amount of information that is stored in the track 11 is stored in the track 21 in 25% less space, or stated another way, 33⅓% more binary information is stored in the same space so that the densisty of the information stored is increased by 33⅓%.

If the information stored in the track 21 were read out by relative movement between the track 21 and a reading station at a constant rate, a pulse train corresponding to the waveform 23 would be produced. When this waveform 23 is passed through a full wave rectifier, a pulse train corresponding to the waveform 25 would be produced. In the waveform 25, the pulses designated by the reference number 27 occurring at regular intervals are the clock pulses, and the pulses occurring intermediate the pulses 27 are information pulses.

In order to distinguish the information pulses from the clock pulses in the wave form 25, it would be necessary to devise a system which would determine whether each pulse coming after a clock pulse occurs within a short interval, a mediun interval (which is twice as long as the short interval) or a long interval (which is three times as long as the short interval and 50% longer than the medium interval). Because of pulse crowding which results from the fact that flux transitions are not precisely positioned in the track 21, it would be difficult to always distinguish between a "medium" length interval and a "long" interval, if the flux transitions are placed on the track 21 with the same density as they are in the track 11.

The medium and long intervals would become indistinguishable in some instances because some of the medium length intervals would be lengthened out and some of the long intervals would be shortened to an extent where the lengthened "medium" intervals would be the same length as the shortened "long" intervals. Thus, the system for separating the clock pulses from the information pulses could not, in all instances, tell whether the next succeeding pulse after a clock pulse is another clock pulse which has been preceded by two 0's or is an information pulse which has been preceded by one 0.

This ambiguity can be avoided by decreasing the density with which the flux transition positions are placed in the track 21. However, to avoid the ambiguity, the density of the flux transition positions must be reduced to a point where the information density is nearly the same as the information density in the track 11, and thus, the gain by using the system illustrated in FIG. 2 is not large.

THE PRESENT INVENTION

In the system of the present invention, the information bits are recorded at a ratio of two information bits in the track for each clock pulse, but the pulse crowding problem of FIG. 2 is avoided by using a special code to store the binary information in the track. In accordance with the present invention, the binary digits of information are divided into pairs, with each pair being represented by the flux transistions in three adjacent positions in the track where the flux transitions can occur. Table I illustrates the code used for all possible binary pairs.

TABLE I

| Pairs of Binary Digits | Flux Transition Positions 1st | 2nd | 3rd |
|---|---|---|---|
| | | Mode 1 | |
| 0 1 | – | × | × |
| 1 0 | × | – | × |
| 1 1 | × | × | × |
| *0 0 | – | × | – |
| ** 0 0 | × | × | – |
| | | Mode 2 | |
| 0 0 | × | – | × |
| 0 1 | × | × | × |
| 1 0 | × | – | × |
| 1 1 | × | × | × |

* 1st digit of next succeeding pair = 0
** 1st digit of next succeeding pair = 1

In Table I, the presence of a flux transition in a given position is represented by "×", and the absence of a flux transition is represented by "–". Each pair of binary digits is represented by a combination of presences and absences of flux transitions in three successive or adjacent positions in the magnetic track. The first position as designated in Table I is the position first to be sensed by a reading station and is conventionally illustrated in the left column. The second column is the middle position, and the third column is the last position to be sensed by the reading station. The three positions make up what is referred to as an information "cell."

As illustrated in Table I, the system records either in Mode 1 or in Mode 2. Mode 2 is used only when the preceding pair of binary digits are 0 0 and were recorded in Mode 1. Mode 1 is always used to record the next succeeding pair of digits after a pair of digits have been recorded in Mode 2.

As shown in Table I, the binary pair 0 1 is represented in Mode 1 by the absence of a flux transition in the first position followed by two successive flux transitions. The binary pair 1 0 is represented in Modes 1 and 2 by a flux transition in the first and third positions and the absence of a flux transition in the middle position. The binary pair 1 1 is represented in Modes 1 and 2 by three successive flux transitions.

The binary pair 0 0 can be represented in Mode 1 either by a flux transition in the middle position and the absence of flux transitions in the first and third positions, or it can be represented by two successive flux transitions in the first two positions and the absence of a flux transition in the third position, depending upon whether the first binary digit in the next succeeding pair of binary digits to be recorded is a 1 or a 0.

If, after the binary pair 0 0, the first digit of the next successive pair is a 0, then the binary pair 0 0 is represented by a flux transition in the middle position and the absence of a flux transition in the first and third positions. If the binary pair 0 0 is succeeded by a binary pair the first digit of which is a 1, then the binary pair 0 0 is represented by flux transitions in the first two positions and the absence of a flux transition in the third position. Also, each time the binary pair 0 0 is recorded, the next binary pair is recorded in accordance with the code of Mode 2 in the above table.

In Mode 2, the first binary digit of the pair has no effect on the code, since the first binary digit in effect has been recorded by the code used to record the preceding pair of digits, which were 0 0. If the second binary digit of the pair in Mode 2 is a 0, then this is represented by a flux transition in the first and third positions and the absence of a flux transition in the second position. If the second digit of the pair in Mode 2 is a 1, then this is recorded by flux transitions in all three positions.

After a recording of a pair of binary digits in Mode 2, the system automatically switches back to record the next pair of digits in Mode 1.

In this manner, all combinations of binary digits can be recorded by the presence or absence of flux transitions in three successive positions, and the condition never occurs when two adjacent positions of flux transitions do not have at least one flux transition therein. Accordingly, the readout system never has to distinguish between a long interval and a medium length interval between the pulses produced by successive transitions.

Because of this feature, information can be recorded with the same density as the information illustrated in FIG. 1. As a result, an increase in information density of 33⅓% is achieved.

ILLUSTRATING THE PRESENT INVENTION

FIG. 3 illustrates how the information in FIG. 1 is recorded in a track 29 by the system of the present invention. In the track 29, the information cells are separated by the imaginary dashed lines 31. As pointed out above, each information cell contains three flux transition positions and stores a pair of binary digits.

The first binary pair 0 1, as shown in FIG. 3, is recorded by flux transitions in the second and third positions and the absence of a flux transition in the first position. The second binary pair 0 0 is recorded by a flux transition in the first and second positions and the absence of a flux transition in the third position, since the first digit of the next succeeding pair is a "1".

The next suceeding pair of binary digts 1 1 is recorded in Mode 2, since the preceding pair of digits is 0 0. Since the second digit of this pair is a "1," the binary pair 11 in Mode 2 is recorded by flux transitions in all three positions.

The next pair of binary digits 0 0 is recorded in the corresponding cell by a flux transition in the middle position and the absence of flux transitions in the first and third positions, since the first digit of the next succeeding pair of binary digits is a 0. The last pair of binary digits 0 1 is recorded in the corresponding cell by the code of Mode 2, since the preceding pair of digits is 0 0. Since the second digit of this pair is a "1," flux transitions are provided in all three positions of this cell.

When the information stored in the track 29 is read out by relative movement between the track 29 at a constant speed relative to a reading station, a pulse train corresponding to the waveform 33 will be produced. When this pulse train is full-wave-rectified, a pulse train corresponding to the waveform 35 will be produced. It will be noted from the waveform 35 that there are intervals between successive pulses of only two different lengths, one of which is twice the other. Accordingly, it is not necessary to distinguish between long and medium length intervals to decode the information represented by the pulse train and to separate it into binary information pulses and into clock pulses. It is only necessary to distinguish between intervals of a first short length and a second length which is twice as long as the first length.

LOGIC CIRCUIT OF THE INVENTION

FIG. 4 is a block diagram of a circuit which will record binary information in accordance with the code of the present invention as described above. The binary information to be recorded is stored first in the buffer register 51 with one information bit being recorded in each stage of the register. The first pair of binary digits to be recorded are stored in the stages 53 and 55 of the buffer register with the first digit of the first pair being stored in the stage 53. The second pair of binary digits to be recorded are stored in the ranges 57 and 59 of the register 51.

The register 51 can have stages to store as many pairs of binary digits as desired.

An an appropriate time, in a manner to be described, an enabling signal will be applied to a set of AND gates 61, and the binary digits stored in the buffer register 51 will pass through the gates 61 to be stored in a shift register 62. The pair of binary digits stored in the stages 53 and 55 will be stored in the stages 63 and 65 of the shift register 62. The pair of binary digits stored in the stages 57 and 59 of the buffer register 51 will be stored in the stages 67 and 69, respectively, of the shift register 62.

The number of stages of the shift register 62 will correspond to the number of stages in the buffer register 51, so that each binary digit stored in the buffer register 51 is stored in the corresponding stage in the shift register 62 when the gates 61 are enabled.

A crystal oscillator 71 produces output pulses at a rate corresponding to the rate at which transition positions in the magnetic track in which the information is to be recorded pass a recording station or "head" 72. As the recording is carried out, the magnetic track in which the information is recorded passes the recording head 72 at a constant speed.

The pulses produced by the crystal oscillator 71 are applied to a ring counter 73 which, in response to receiving the pulses produced by the crystal oscillator 71, produces on output channels 75, 77 and 79, in sequence, with one pulse being produced on one of the channels 75, 77 and 79 each time the oscillator 71 applies a pulse to the ring counter 73. The pulse produced on the channel 75 will occur simultaneously with the movement of the first flux transition position in each information cell past the recording head 72.

The pulses produced on the channel 77 will occur simultaneously with the movement of the second flux transition position in each information cell past the recording head 72. The pulses produced on the channel 79 will occur simultaneously with the movement of the third flux transition position in each information cell past the recording head 72.

The recording head 72 is controlled by a flip-flop circuit 81 which produces an output signal, which in turn is amplified by an amplifier circuit 83 and is applied to the recording head 72. In one state, the flip-flop circuit 81 produces an output signal of one polarity, which is amplified by the amplifier 83 and applied to the recording head 72 to cause the recording head to produce flux in the recording track in one direction.

In the opposite state, the flip-flop circuit 81 produces an output signal of the opposite polarity which, upon being amplified by the amplifier 83 and applied to the recording head 72, causes the recording head 72 to record flux in the recording track in the opposite direction. Accordingly, each time the flip-flop circuit 81 is caused to change states, a flux transition is recorded in the recording track.

Gate circuits 85 through 92 respond to the binary digits stored in the first two stages 63 and 65 of the shift register 62 to record a combination or pattern of presences and absences of flux transitions in the flux transition positions in each cell corresponding to the pair of binary digits in the first two stages 63 and 65. In the case of the stages 63 and 65 storing the binary pair 0 0, the gates 85 through 92 respond to the digit stored in the stage 67 to store the proper pattern of flux transitions in the information cell currently passing the recording head 72.

When a complete pattern of flux transitions has been stored in the three transition positions of an information cell, the shift register will be shifted twice to shift the digits in stages 67 and 69 to the stages 63 and 65. A pattern of flux transitions corresponding to the new digits in the stages 63 and 65 will be recorded then in the next information cell.

The shifting of the shift register 62 is carried out in response to a pulse produced by the ring counter 73 on the channel 79. The pulse produced on the channel 79 passes through a delay line 93 and is applied through an OR gate 94, to shift the shift register 62 once, and through a delay line 96 and through the OR gate 94, to shift the shift register 62 a second time. The delay lines 93 and 96 are selected so that the shifting of the shift register occurs entirely between the pulses produced on the channels 79 and 75.

A counter 98 is provided to count the pulses passing through the delay line 93, and when the last pair of digits are being shifted out of the register 62, the counter 98 produces an output pulse. The output pulse produced by the counter 98 passes through a delay line 99 and is applied then to the gates 61 to shift the contents of the buffer register 51 to the shift register 62. The output pulse of the delay line 99 is applied also to the information source, providing an indication that the buffer register 51 is ready to be refilled.

The delay line 99 is selected so that the output pulse of the delay line 99 occurs after the second shift of the shift register 62 by the output pulse of the delay line 96 but before the ring counter 73 produces a pulse on the channel 75. Accordingly, immediately after the binary information has been transferred from the buffer register 51 to the shift register 62, the next pulse that will be produced by the ring counter 73 will be produced on the channel 75. This pulse is applied to the gates 85, 86 and 87.

If the stage 63 of the shift register 62 stores a "1," it will enable the gate 85 so that the pulse produced on the channel 75 will pass through the gate 85. This pulse, upon passing through the gate 85, then will pass through an OR gate 84 to a flip-flop circuit 81 to cause the flip-flop circuit 81 to change states and, thus, cause the transition to be recorded on the tape.

From Table I illustrating the code of the present invention, it will be observed that a transition will be placed in the first transition position of a cell whenever the first binary digit of a pair to be recorded in a cell is "1." Thus, the pulse passing through the gate 85 causes a flux transition to be recorded in the first flux transition position of a cell whenever the first stage of the register 63 stores a "1."

The gate 86 will be enabled whenever the stage 65 of the shift register 62 stores a "0" and the stage 67 stores a "1." Accordingly, if the stage 65 stores a "0" and the stage 67 stores a "1," the pulse produced on the channel 75 will pass through the gate 86 and then through the OR gate 84 to the flip-flop circuit 81 to cause the flip-flop circuit 81 to change states. From the Table I, it will be observed that whenever the second digit of the pair to be recorded is zero, and the first digit of the next preceding pair is a one, then a flux transition should be recorded in the first position of the information cell. Accordingly, the pulse passing through the gate 86 will properly cause the flip-flop circuit 81 to switch states and cause a flux transition to be recorded in the first position of the cell.

It will be noted that in some instances, pulses will pass through both of the gates 85 and 86 simultaneously. This will still effect only the recording of one flux transition since both pulses will pass through the OR gate 84 at the same time and will be combined into a single pulse to cause the flip-flop circuit 81 to change states only once. In a similar manner, pulses will pass through other ones of the gates 85–92 simultaneously and will effect the recording of only one flux transition.

The gate 87 will be enabled by a flip-flop circuit 95 whenever the flip-flop circuit 95 is in its B state. The flip-flip circuit 95 is referred to as the "mode flip-flop" and will be placed in its B state by circuitry to be described whenever the recording is to be in Mode 2. The mode flip-flop will be in its A state whenever the recording is to be in Mode 1. Accordingly, the gate 87 will be enabled whenever the recording is to be carried out in Mode 2, and accordingly, the pulse produced on the channel 75 will pass through the gate 87 and through the gate 84, to cause the flip-flop circuit 81 to switch to its opposite state, thus effecting a transition.

From the table, it will be noted that a flux transition is to be recorded in the first position of the cell whenever the recording is carried out in Mode 2. Accordingly, the pulse passing through the gate 87 will properly cause a flux transition to be recorded in the first position of the cell.

Thus, it will be seen that a flux transition will be recorded in the first position of the cell whenever the first digit of the binary pair to be recorded is a "1," or whenever the second digit of the binary pair to be recorded is a "0" and the first digit of the next succeeding pair to be recorded is a "1," or whenever the recording is carried out in Mode 2. At all other times, no flux transition will be recorded in the first position of the cell. That is, no transition will be recorded when the first digit of the binary pair to be recorded in the cell is a "0" and the second digit of the binary pair is a "1," or when the first and second digits of the binary pair are both "0's" and the first digit of the next succeeding pair to be recorded is also a "0."

The pulse produced by the ring counter 73 on the channel 77 is applied to the AND gates 88 and 89. The gate 88 will be enabled whenever the digit stored in the stage 65 contains a "1," and the gate 89 will be enabled whenever the mode flip-flop 95 is in its A state and the stage 63 of the register 62 stores a "0." From Table I, it will be apparent that a transition is to be recorded in the middle position of the cell in both Modes 1 and 2 whenever the second digit of the binary pair is a "1." Accordingly, the pulse produced on the channel 77 will pass through the enabled gate 88 and through the OR gate 84 to cause the flip-flop circuit 81 to change to the opposite state and to effect the recording of a flux transition in the second position of the cell whenever the stage 65 stores a "1."

It will be noted from Table I also that in Mode 1 a flux transition will be recorded in the second position of a cell whenever the first digit of the pair to be recorded in the cell is a "0." When the gate 89 is enabled, the pulse produced on the channel 77 will pass through the gate 89 and then through the OR gate 84 to the flip-flop circuit 81 to cause the flip-flop circuit 81 to change states and effect the recording of the flux transition in the second position of the cell. Accordingly, a flux transition will be recorded in the second position of the cell whenever the second digit of the binary pair to be recorded is a "1," or whenever the recording is being carried out in Mode 1 and the first binary digit to be recorded is a "0."

The pulse produced on the channel 79 is applied to the gates 90, 91 and 92. The gate 90 will be enabled whenever the register 63 stores a "1." When the gate 90 is enabled, the pulse produced on the channel 79 will pass through the gate 90, then through an OR gate 97, and then through the OR gate 84 to the flip-flop circuit 81. Accordingly, the flip-flop circuit 81 will switch states and will effect a recording of a transition in the third position of the cell. Thus, a transition will be recorded in the third position of the cell whenever the first digit of the binary pair to be recorded in the cell is a "1." It will be noted from Table I that a flux transition should be recorded in the third position of the cell in every instance in which the first binary digit is a "1."

The gate 91 will be enabled whenever the stage 65 stores a "1." Accordingly, when the stage 65 stores a "1," a pulse will pass through the gate 91, then through the OR gate 97, and then through the OR gate 84 to the flip-flop circuit 81 to cause a flux transition to be recorded in the third position of the cell. Thus, a flux transition will be recorded in the third position of the cell whenever the second digit of the pair to be recorded is a "1." From Table I, it will be noted that a flux transition should appear in the third position of the cell in all instances in which the second digit of the pair to be recorded in the cell is a "1."

The gate 92 will be enabled whenever the mode flip-flop 95 is in its B state. Accordingly, the pulse produced on the channel 79 will pass through the gate 92 whenever the mode flip-flop 95 is in its B state. The pulse, upon passing through the gate 92, will pass through the OR gate 97 and, then, through the OR gate 84 to the flip-flop circuit 81 to effect the recording of a flux transition in the third position of the cell currently under the recording head. Thus, a flux transition will be recorded in the third position of the cell whenever the recording is being carried out in Mode 2. As indicated in Table I, a flux transition should be recorded in the third position of the cell in all instances when the encoding is being carried in Mode 2.

Accordingly, a flux transition will be recorded in the third position of a cell whenever the first digit of the pair of digits to be recorded is a "1," or whenever the second digit of the pair of digits to be recorded is a "1," or whenever the recording is being carried in Mode 2. Whenever the recording is being carried out in Mode 1 and both of the digits of the binary pair to be recorded are "0's," then no flux transition is recorded in the third position of the cell.

Each time a pulse passes through the OR gate 97, it is applied also to the mode flip-flop 95, and each pulse produced on the channel 79 is applied similarly to the mode flip-flop 95. The pulse produced on the channel 79 will set the mode flip-flop 95 in its B state, but the mode flip-flop 95 will be reset to its A state by the trailing edge of a pulse passing through the OR gate 97, if such a pulse does pass through the OR gate 97. Thus, the mode flip-flop 95 will be set in its B state to cause recording of the next cell in Mode 2, unless a pulse passes through the OR gate 97.

A pulse will pass through the OR gate 97 if a pulse passes through any one or more of the AND gates 90, 91 and 92. As pointed out above, the gate 90 will be enabled whenever the stage 63 of the shift register stores a "1," and the gate 91 will be enabled whenever the stage 65 of the shift register stores a "1." Accordingly, a pulse will pass through the gate 97 if either the stage 63 or the stage 65 stores a "1," and the recording in the next cell will be in Mode 1.

Similarly, if the recording of the cell presently at the recording head 72 is in Mode 2, the mode flip-flop 95 will be in its B state and the gate 92 will be enabled. Accordingly, the pulse produced on the channel 79 will pass through the gate 97 and cause the mode flip-flop 95 to be switched to its A state for the next succeeding cell. Accordingly, whenever the preceding cell is recorded in Mode 2, the next succeeding cell will be recorded in Mode 1. Thus, the only time that the mode flip-flop 95 will be switched to its B state and maintained there for recording in Mode 2, will be when the recording in the preceding cell was in Mode 1 and the pair of binary digits recorded were 0 0.

In this manner, the system of the present invention encodes the binary data in accordance with Table I described above.

When binary information is reocrded in recorded magnetic track in accordance with the present invention in the manner described above and then the information is read out by moving the track and a reading head at a constant rate relative to each other, the interval between successive pulses will either be a short interval or a long interval twice as long as the short interval. As illustrated in the waveform 35 in FIG. 3, a long interval will occur when a flux transition is not recorded in one of the flux transition positions in a cell.

DECODING LOGIC CIRCUIT

FIG. 5 is a block diagram of a circuit for decoding the pulses train that is produced when a track of information, which is encoded in accordance with the present invention, is read out. The pulse train produced, after being full wave rectified to make the pulses all have the same polarity, is applied to a pair of gates 101 and 103 and through a delay line 105 to a one-shot multivibrator 107. The multivibrator 107 normally will enable the gate 103, but upon receiving a pulse through the delay line 105 will remove the enabling signal from the gate 103 and will enable the gate 101 for a short time interval.

The delay line 105 and the time interval that the multivibrator 107 enables the gate 101 are selected so that the gate 101 will be enabled when the next succeeding pulse is applied to the gate 101, if the interval before this next succeeding pulse is a short interval. Accordingly, if the interval between the next succeeding pulse is a short interval, the pulse will pass through the gate 101 and will appear on a channel 109.

If the interval before the next succeeding pulse is a long interval, the multivibrator will switch back to its normal state and will enable the gate 103 before the next succeeding pulse is applied to the gates 101 and 103, so that the next succeeding pulse will pass through the gate 103 and will appear on a channel 111. Thus, all pulses in the pulse train which are preceded by a short interval will appear on channel 109, and all pulses which are preceded by a long interval will appear on channel 111.

The pulses which are produced on the channel 109 are applied to gates 113, 114 and 115. All of the pulses appearing on the channel 111 are applied to gates 116, 117 and 118. The enabling of the AND gates 113 through 118 is controlled by a counter 120. which includes two flip-flop circuits 121 and 123.

The counter 120 has three operative states A, B and C. When the flip-flop circuit 121 is in its ONE state and the flip-flop circuit 123 is in its ZERO state, the counter will be in state A. When the flip-flop 121 is in its ZERO state and the flip-flop 123 is in its ONE state, the counter will be in state B. When both of the flip-flops 121 and 123 are in their one states, the counter will be in state C. The counter 120 has a fourth inoperative state when both of the flip-flops 121 and 123 are in their ZERO states and can be set to the inoperative state by a pulse applied to an input circuit 124.

When the counter 120 is in state A, the gates 114 and 118 will be enabled. When the counter 120 is in state B, only the gate 117 will be enabled. The AND gate 113 will be enabled when the flip-flop 121 is in its ZERO state, which means, in other words, the gate 113 will be enabled whenever the counter 120 is in state B and whenever the counter 120 is in its inoperative state. When the counter 120 is in state C, the gates 115 and 116 will be enabled.

The letters on the outputs connections of the gates 113 through 118 signify the pulses that are applied to the gates and in which state of the counter 120 the respective gates are enabled. Thus, the letter S on an output connection indicates that the pulses on the channel 109, preceded by a short interval, are applied to that gate. The letter L signifies that the pulses on the channel 111, preceded by a long interval, are applied to that gate. The letters A, B and C signify in which state of the counter 120 the respective gates are enabled.

The state of the counter 120 is controlled by the pulses passing through the gates 113 through 118 so that it changes to correspond with the transition position of the information cell currently being sensed by the reading head. If the first transition position of a cell is being sensed, then the counter 120 should be in state A. If the second transition position of a cell is being sensed, then the counter should be in state B. If the third transition position is being sensed, the counter 120 should be in state C.

By way of example, assuming that the counter 120 is in state A ready for sensing the first transition position, so that the gates 114 and 118 are enabled, then a pulse appearing on the channel 109 will pass through the gate 114 and then through OR gates 125 and 127 to switch the flip-flops 121 and 123 to their opposite states. The flip-flop 121 will go to its ZERO state, and the flip-flop 123 will go to its ONE state. Accordingly, the counter 120 will be set in state B and will be in the proper state to correspond to the sensing of the second transition position in the cell.

Now, if the counter 120 is in state B, and a pulse is produced on the channel 109, then this pulse will pass through the enabled gate 113 and then through the OR gate 125 to switch the flip-flop 121 to its opposite state, so that both of the flip-flops 121 and 123 will be in their ONE states. Thus, the counter 120 will be in state C and will be in the proper condition for the sensing of the third position of the information cell.

If the counter is in state C, and a pulse is produced on the channel 109, this pulse will pass through the enabled gate 115 and then through the OR gate 127 to switch the flip-flop 123 to its opposite state, so that the flip-flop 121 will remain in its ONE state, and the flip-flop 123 will be placed in its ZERO state. Thus, the counter 120 will be in state A and will be in the proper condition for the sensing of the first position in the next cell.

If the counter 120 is in state A ready to sense the condition of the first cell and a pulse is produced on the channel 111 (instead of channel 109) indicating that this pulse was preceded by a long interval, then the pulse produced on the channel 111 will pass through the enabled AND gate 118 and then through the OR gate 127 to switch the flip-flop 123 to its opposite state. Accordingly, the flip-flops 121 and 123 will both be in their ONE states. The counter then will be in state C and in a condition to sense the third position in a cell. Thus, the second position was skipped.

The reason for this skipping is that the pulse produced on the channel 111 was preceded by a long interval, which means that there was no flux transition in the first position in the information cell, and the pulse produced on the channel 111 actually was the result of a flux transition in the second position in the information cell. Accordingly, the counter 120 is set to state C to sense the third position in the information cell.

If the counter 120 is in state B so as to be in a condition for sensing the second flux transition position in a cell and a pulse is produced on the channel 111, the pulse will pass through the enabled gate 117. After passing through the gate 117, the pulse will pass through the OR gates 125 and 127 to switch both of the flip-flops 121 and 123 to their opposite states.

Accordingly, the flip-flop 121 will be placed in its ONE state, and the flip-flop 123 will be placed in its ZERO state, so that the counter 120 will be placed in state A. Thus, the counter 120 will be in a condition for sensing the first flux transition position of the next succeeding cell.

The reason the counter 120 is switched to state A, to sense the condition of the first flux transition position in the next succeeding cell instead of the third flux transition position of the present cell, is because the pulse produced on the channel 111 is preceded by a long interval and occurs as a result of there being no flux transition in the second cell. The pulse produced on the channel 111, therefore, actually occurs as a result of a flux transition in the third cell, and accordingly, the counter should be placed in state A for sensing the first flux transition position of the next succeeding cell.

Similarly, if the counter 120 is in state C for sensing the third flux transition position of an information cell and a pulse is produced on the channel 111, the pulse will pass through the enabled gate 116 and through the OR gate 125 to switch the flip-flop 121 to its opposite state. Accordingly, the counter 120 will be placed in state B for the sensing of the second flux transition position of the next succeeding information cell.

Table II illustrates when pulses preceded by long and short intervals are produced corresponding to information cells recording different pairs of binary digits during read out.

TABLE II

| Pair of Binary Digits 1st | 2nd | Flux Transitions Positions in Cell 1st | 2nd | 3rd | PULSES Transition Position 1st | 2nd | 3rd | Counter State A | B | C |
|---|---|---|---|---|---|---|---|---|---|---|
| | | | MODE 1 | | | | | | | |
| 0 | 1 | – | × | × | – | L | S | L | – | S |
| 1 | 0 | × | – | × | S | – | L | S | L | – |
| 1 | 1 | × | × | × | S | S | S | S | S | S |
| *0 | 0 | – | × | – | – | L | – | L | – | L |
| **0 | 0 | × | × | – | S | S | – | S | S | L |
| | | | MODE 2 | | | | | | | |
| 0 | 0 | × | – | × | L | – | L | – | L | – |
| 0 | 1 | × | × | × | L | S | S | – | S | S |
| 1 | 0 | × | – | × | L | – | L | – | L | – |
| 1 | 1 | × | × | × | L | S | S | – | S | S |

TABLE II-Continued

| Pair of Binary Digits 1st | 2nd | Flux Transitions Positions in Cell 1st | 2nd | 3rd | PULSES Transition Position 1st | 2nd | 3rd | Counter State A | B | C |
|---|---|---|---|---|---|---|---|---|---|---|
| | | | MODE 1 | | | | | | | |

* 1st digit of next pair = 0
** 1st digit of next pair = 1

The first five columns of Table II are the same as those in Table I. The next three columns indicate at which transition position pulses are read out when an information cell containing a given pair of binary digits is detected.

The presence of pulses is indicated by the letters L and S, with the letter L indicating that the pulse is preceded by a long interval and will appear on the channel 111, and with the latter S indicating that the pulse is preceded by a short interval and will appear on the channel 109. Thus, Table II indicates that when the pair of binary digits 0 1 recorded in Mode 1 is read out, a pulse preceded by a long interval will be produced at the second transition position, and a pulse preceded by a short interval will be produced at the third transition position. Similarly, Table II indicates that when an information cell recorded in Mode 2 containing the binary pair 1 0 is read out, pulses preceded by a long interval will be produced at the first and third transition positions of the cell.

The counter 120, as pointed out above, should be in state A to sense the first transition position, in state B to sense the second position and in state C to sense the third transition position. However, as pointed out above, when a pulse is preceded by a long interval, the counter 120 actually will be one state behind. That is, for example, when a pulse preceded by a long interval is produced at the first transition position, the counter 120 will be in state C. Similarly, when a pulse preceded by a long interval is produced at the second transition position, the counter 120 will be in state A, and when a pulse preceded by a long interval is produced at the third transition position, the counter 120 will be in state B.

The last three columns of Table II indicate the particular state the counter 120 is in as the pulses are produced when the information cells containing different pairs of binary digits are read out. The presence of a pulse preceded by a long interval is indicated again by the letter L, and the presence of a pulse preceded by a short interval is indicated by the letter S.

Thus, when an information cell recorded in Mode 1 containing the pair of binary digits 0 1 is read out, a pulse preceded by a long interval is produced when the counter 120 is in state A and a pulse preceded by a short interval is produced when the counter 120 is in state C. When an information cell recorded in Mode 2 containing the pair of binary digits 1 0 is read out, a pulse preceded by a long interval is produced when the counter 120 is in state B. On the other hand, when an information cell containing the pair of binary digits 1 1 is read out in Mode 2, a pulse preceded by a short interval is produced when the counter is in state B, and a pulse preceded by a short interval is produced when the counter is in state C.

It will be noted from Table II that whenever a pulse preceded by a short interval is produced when the counter 120 is in state C, the information cell read out in both Modes 1 and 2 contains a "1" as the second binary digit. As described above, the gate 115 has pulses preceded by a short interval applied thereto and is enabled when the counter 120 is in state C. Thus, whenever a pulse passes through the gate 115, the second digit of the binary pair recorded in the cell currently being read out is a "1." Accordingly, pulses passing through the gate 115 are applied to an output terminal 129 to indicate that the second digit of the information cell read out contains a 1.

From Table II it will also be noted that when an information cell recorded in Mode 1 is being read out and a pulse is produced preceded by a short interval when the counter 120 is in state A followed by a pulse preceded by a long interval when the counter 120 is in state B or followed by a pulse preceded by a short interval when the counter 120 is in state C, then the first digit in the information cell read out is a binary "1."

As described above, the gate 114 will be enabled when the counter 120 is in state A and is connected to receive pulses preceded by a short interval. Each pulse passing through the gate 114 is applied to a flip-flop 131 to set the flip-flop 131 in its ONE state. Accordingly, the flip-flop 131 will be set in its ONE state whenever a pulse preceded by a short interval is produced with the counter 120 in its A state.

A pulse passing through the gate 118 will set the flip-flop 131 back to its ZERO state. As described above, a pulse will pass through the gate 118 whenever a pulse is produced preceded by a long interval when the counter 120 is in state A. Thus, the flip-flop 131 will be set in its ONE state when a cell recorded in Mode 1 with a binary 1 as the first digit is read out and when the binary pair 0 0 recorded in Mode 1 is read out followed by a cell recorded in Mode 2 in which the first digit is a 1. The flip-flop 131 will be set back to its ZERO state whenever the binary pair 0 1 recorded in Mode 1 is read out or whenever the binary pair 0 0 recorded in Mode 1 is read out, followed by a cell recorded in Mode 2 containing a binary 0 as the first digit.

Upon being set in its ONE state, the flip-flop 131 will enable a gate 133. As described above, a pulse preceded by a long interval when the counter 120 is in state B will pass through the gate 117. After passing through the gate 117, the pulse will pass through an OR gate 135 and be applied to the gate 133. Thus, if a pulse is produced preceded by a short interval with the counter 120 in state A, and, then, a pulse preceded by a long interval is produced when the counter 120 is in state B, the gate 133 will be enabled and a pulse from gate 117 will pass through the OR gate 135 and through the gate 133 to an output terminal 137. The pulse at the output 137 indicates that the first digit of the information cell read out is a "1."

As described above, a pulse produced preceded by a short interval when the counter 120 is in state C will pass through the gate 115. Upon passing through the gate 115 the pulse will pass through the gate 135 and to the gate 133. If the gate 133 is enabled, it will pass through to the output 137. Thus, a pulse will be produced at the output 137 if a pulse is preceded by a short interval when the counter is in state A and also if a pulse is preceded by a long interval when the counter is in state B or if a pulse is preceded by a short interval when the counter 120 is in state A and if a pulse is preceded by a short interval when the counter 120 is in state C.

Accordingly, a pulse will be produced at the output 137 in all instances in Mode 1 when the first digit of an information cell contains a "1."

Since no pulses are produced when the counter 120 is in state A when a cell recorded in Mode 2 is read out, as can be observed from Table II, the flip-flop 131 will remain in the state that it was in in the preceding cell, when a cell recorded in Mode 2 is read out. Thus, the flip-flop 131 will be in its ONE state and will enable the gate 133 if the first digit of the cell being read out in Mode 2 is a "1."

From Table II, it will be noted that when a cell recorded in Mode 2 is being read out, a pulse will be produced preceded by a long interval when the counter is in state B, or alternatively, a pulse will be produced preceded by a short interval when the counter is in state C. Thus, a pulse will be applied to the gate 133 from the gate 117, or from the gate 115, whenever a cell recorded in Mode 2 is read out.

Thus, a pulse will be produced at the output 137 whenever the first digit of a cell recorded in Mode 2 is read out. Accordingly, in all instances in Modes 1 and 2, a pulse will be produced at the output 137 when the first digit of the information cell being read out is a "1."

Pulses passing through the gates 114, 116 and 118 are applied through an OR gate 139 to an output terminal 141. The pulses produced at the output 141 are the clock pulses for the information pulses produced at the outputs 129 and 137. As described above, a pulse will pass through the gate 114, when the counter 120 is in state A and when a pulse is produced preceded by a short interval. A pulse will pass through the gate 116, when a pulse is produced preceded by a long interval with the counter 120 in state C, and a pulse will pass through the gate 118, when a pulse is produced preceded by a long interval with the counter 120 in state A. With this arrangement, one clock pulse will be produced at the output 141 for each information cell.

The information pulses produced at the outputs 129 and 137 will occur at the third transition position of each information cell. The clock pulses will occur either at the first or at the second transition position of each cell. If the clock pulse is produced by a pulse passing through the gate 114, it will occur at the first transition position of the cell. If the clock pulse is produced by a pulse passing through the gate 116, the clock pulse will be produced at the first transition position of the cell. If the clock pulse is produced by a pulse passing through the gate 118, it will be produced at the second transition position of the cell.

Thus, the information pulses produced at the outputs 129 and 137 will be produced between successive clock pulses. The presence of a pulse at the output 137 between successive clock pulses means that the first digit of the cell being read out is a "1," and the absence of a pulse at the output 137 between successive clock pulses means that the first digit of the cell being read out is a "0."

Similarly, the presence and absence of pulses at the output 129 between successive clock pulses indicates that the second digits of the cells currently being read out are "1's" and "0's," respectively. Thus, the circuit of FIG. 5 reproduces the binary information recorded by the system of the present invention.

The above described system is a preferred embodiment of the invention, and many modifications may be made thereto without departing from the spirit and scope of the invention, which is defined in the appended claims.

What is claimed is:

1. A decoding means for representing clock and information pulses from a train of pulses which are separated by first and second intervals of different lengths, comprising:

means to separate said pulses into a first group which are preceded by said first interval and a second group which are preceded by said second interval, a counter, a first plurality of gates connected to receive said pulses of said first group, a second plurality of gates connected to receive said pulses of said second group, means to enable a different one of the gates in each of said first and second pluralities in response to each different condition of said counter, and means to switch said counter between its conditions in a first manner in response to pulses of said first group and to shift said counter between its conditions in a second manner in response to pulses of said second group.

2. A decoding means as recited in claim 1 wherein said counter has at least three conditions and wherein said means to enable said gates is operable to enable a different one of the gates in each of said first and second pluralities in response to each different one of said three conditions.

3. A decoding means as recited in claim 2 wherein said conditions have a defined sequence, wherein said first interval is shorter than said second interval, and wherein said means to switch said counter is operable to switch said counter to the next condition in said sequence in response to pulses of said first group and to switch said counter to the condition after the next condition in said sequence in response to pulses of said second group.

4. A decoder as recited in claim 1 further comprising means responsive to the pulses passing through said gates of said first and second plurality to derive clock signals and data signals from said pulses.

5. A decoding means as recited in claim 1 further comprising means responsive to pulses passing through a first combination of said gates to derive clock signals and means responsive to signals passing through a second combination of said gates to derive data signals.

6. A decoding means as recited in claim 5 wherein said clock signals occur between said data signals.

* * * * *